A. J. HALL.
CONTROL SYSTEM.
APPLICATION FILED MAY 25, 1914.
1,233,346.
Patented July 17, 1917.
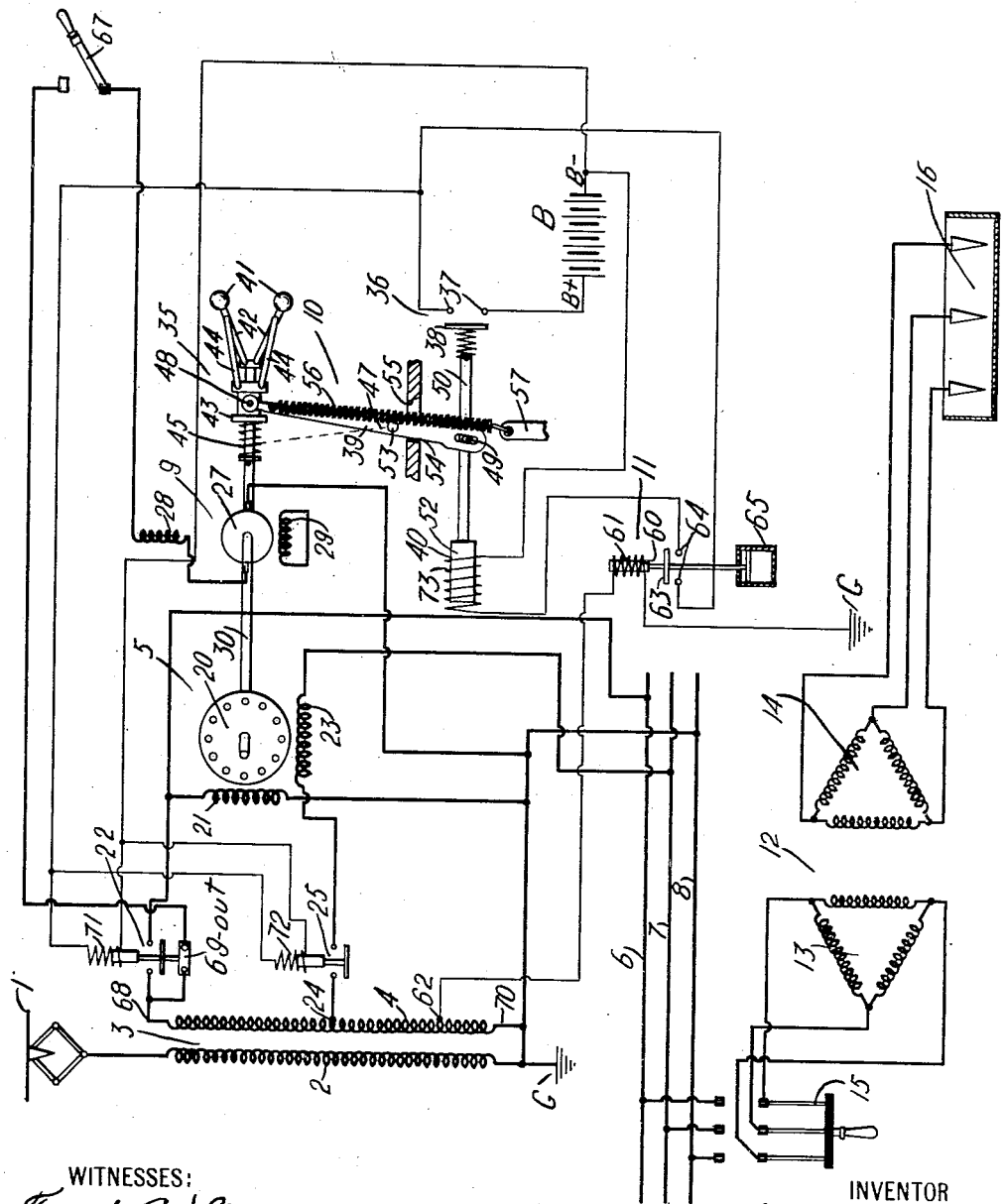
WITNESSES:
Fred. A. Lind.
D. H. Mace
INVENTOR
Arthur J. Hall
BY
Wesley J. Carr
ATTORNEY

UNITED STATES PATENT OFFICE.

ARTHUR J. HALL, OF WILKINSBURG, PENNSYLVANIA, ASSIGNOR TO WESTINGHOUSE ELECTRIC AND MANUFACTURING COMPANY, A CORPORATION OF PENNSYLVANIA.

CONTROL SYSTEM.

1,233,346.  Specification of Letters Patent.  Patented July 17, 1917.

Application filed May 25, 1914. Serial No. 840,719.

*To all whom it may concern:*

Be it known that I, ARTHUR J. HALL, a subject of the King of Great Britain, and a resident of Wilkinsburg, in the county of Allegheny and State of Pennsylvania, have invented a new and useful Improvement in Control Systems, of which the following is a specification.

My invention relates to control systems for dynamo-electric machines, and it has special reference to the control of phase converters such as are employed for converting alternating current single-phase energy into polyphase energy.

The object of my invention is to provide simple, reliable and effective means for disconnecting a phase converter from the source of energy in case of a failure of voltage for a predetermined time, and for automatically reconnecting said converter only under predetermined speed and circuit conditions.

More specifically, the object of my invention is to provide means for automatically utilizing a starting motor for accelerating a phase converter and bringing it up to full speed, connecting the converter to the source of energy when full speed is attained, disconnecting the starting motor, subsequently disconnecting the phase converter from the source of energy when the voltage of the source fails, and for preventing the reconnection of the phase converter to the source until full-speed conditions again obtain.

In a co-pending application, Serial No. 843,930, filed June 9, 1914, by K. A. Simmon and A. J. Hall and assigned to the Westinghouse Electric & Mfg. Co., a control system of a somewhat similar character is disclosed, in which the arrangement of circuits and apparatus is such that, after a failure of the source of energy and a disconnection of the phase converter, said converter may be re-connected to the source when the voltage of the source is restored, irrespective of the speed of the converter. Thus, if the normal speed of the converter is in the neighborhood of 800 revolutions per minute, it is possible to connect it to the source at a very low speed, such as 400 revolutions, which would subject the converter to abuse and mechanical and electrical strains that might result in serious damage and destruction.

It is the purpose of my present invention to provide a system of the general character above indicated and to provide adequate means for obviating the difficulties heretofore experienced and hereinbefore referred to.

The single figure of the accompanying drawing is a diagrammatic view of the system of control embodying my invention.

Referring to the drawing, supply circuit conductors 1 and G deliver single-phase alternating current energy to a primary winding 2 of a transformer 3 having a secondary winding 4 which is connected to a phase converter 5 and to a plurality of bus bars or conductors 6, 7 and 8. The converter 5 is provided with a starting motor 9, a centrifugal switching device 10 and a line relay 11, while a polyphase induction motor 12, having primary windings 13 and secondary windings 14, is adapted to be connected to the conductors or bus bars 6, 7 and 8 by a line switch 15 and to be controlled through the agency of an adjustable-resistance apparatus or liquid rheostat 16.

The phase converter 5 comprises a rotor 20 of the squirrel-cage type, an exciting winding 21 adapted to be connected across the transformer winding 4 by an electrically operated transformer switch 22, and a secondary winding 23 disposed in quadrature with the primary winding 21 and adapted to be connected to substantially the midpoint 24 of the transformer winding 4 by means of an electrically operated transformer switch 25. The converter windings 21 and 23 are so designed that the voltage induced in the secondary winding 23 shall be of the proper value, when combined with the voltage of the transformer winding 4, in accordance with the well-known T or Scott connection, to produce balanced three-phase voltages between bus bars or conductors 6, 7 and 8.

My invention is not, of course, restricted to any particular class of phase converter or to any special connections thereof and, although I have illustrated my control system in connection with a three-phase motor 12, it is equally applicable to any polyphase apparatus.

The starting motor 9 preferably comprises a single-phase commutator motor having an armature 27, a main field winding 28 and a compensating field winding 29, and said starting motor 9 is connected to a shaft 30 upon which the rotor 20 of the phase converter 5 is mounted. The starting motor 9 may, of course, be of any other suitable type, but the class of motor shown, is particularly and conveniently adapted to the system illustrated.

The switching device 10 comprises a centrifugal device 35 which is associated with the shaft 30, a switch 36 having stationary contact terminals 37 and a movable switch member 38, a mechanism 39 for operating said switch 36 by means of the centrifugal device 35, and an electro-magnet 40 for opening the switch 36 under conditions to be hereinafter specified. The centrifugal device 35 may be of any well-known construction and, as shown, embodies a plurality of weights or balls 41 which are associated with the shaft 30 by suitable links 42 and are adapted to effect a longitudinal movement of a grooved sleeve 43 through the agency of links 44 in opposition to a spring 45, under predetermined speed conditions. The mechanism 39 comprises a lever 47 one end of which has a pivotally mounted roller 48 and the other end of which has a pin-and-slot connection 49, to a rod or member 50 that carries the movable switch member 38 and a magnetizable core 52 of the electro-magnet 40. The lever 47 is pivoted, intermediate its ends, upon a pin 53 and is adapted for limited movement between a plurality of stops 54 and 55. A spring 56 is attached to the upper end of the lever 47 and to a stationary member 57 located directly beneath the pivot 53 to move the lever 47 across its dead-center position and to effect a quick action of the switch 36.

The line relay 11 comprises a magnetizable core 60, and an energizing coil 61 which is connected between some point 62 of the transformer secondary winding 4 and the return circuit conductor G, and is, therefore, energized at all times except when the voltage of the source fails. Associated with the magnetizable core 60, is a movable switch member 63 which coöperates with a plurality of stationary contact terminals 64, and, for the purpose of delaying the closing action of the switch members 63 and 64 when the voltage of the source falls, a time-element device or adjustable dash-pot 65 is associated with the core 60. The structure of the time-element device 65 is, of course, unimportant, so long as it is adapted to perform the desired function of providing a predetermined time element in the closing action of the line relay 11.

Assuming the various circuit connections to be as shown in the drawing, the operation of the system is as follows: A starting switch 67 is first closed, thereby completing a circuit from the upper terminal 68 of the transformer winding 4 which includes interlock switch "69—out," switch 67, and main field coil 28 and armature 27 of the starting motor 9 to the other terminal 70 of the transformer winding 4. Upon the completion of the circuit just traced, the starting motor 9 is supplied with energy and operates to bring the phase converter 5 up to its full running speed. When a predetermined speed has been reached, the weights 41 of a centrifugal device 35 are thrown outwardly against the action of the spring 45, whereby the sleeve 43 is moved longitudinally to the left upon the shaft 30. In so doing, the lever 47 is actuated to close the switch members 37 and 38 of switch 36. One side B+ of a battery B, or other suitable source of energy, is thus connected through switch 36 and energizing coils 71 and 72 of the respective electrically operated transformer switches 22 and 25 to the B— side of the battery. The switches 22 and 25 are, therefore, energized and closed.

The closure of the transformer switches 22 and 25 serves to connect the phase-converter windings 21 and 23 to the transformer winding 4, whereby the converter 5 becomes operative and is maintained at its full running speed by reason of its inherent electrical characteristics.

As soon as the transformer switch 22 is raised, its associated interlock switch "69—out" is open circuited, and the starting motor 9 is disconnected from the source of energy and rendered inoperative.

Having brought the phase converter 5 up to its full running speed and established normal operating connections, the line switch 15 may be closed and the rheostat 16 adjusted to govern the operation of the polyphase motor 12, as will be readily understood.

Let it be assumed that, under normal operating conditions, the voltage of the source fails, thereby deënergizing the line relay coil 61 and permitting the switch member 63 to be lowered into engagement with its coöperating terminal 64, in accordance with the action of the dash-pot 65 which should be adjusted for a predetermined time element, for instance 5 seconds, during which period the speed of the converter 5 would decrease to a value that would render it objectionable for reconnection to the source, as will be pointed out more fully hereinafter.

Assuming, therefore, that the failure of voltage continues longer than the interval of 5 seconds for which the dash-pot 65 is adjusted, coöperative engagement is effected between the switch members 63 and 64 of the line relay 11 and a circuit is established from the B+ side of the battery B through switch 36, switch members 63 and 64, and energizing coil 73 of the electro-magnet 40 to the B— terminal of the battery B. The electro-magnet 40 is thus actuated to disengage the switch member 38 from coöperating terminals 37 and also to force the centrifugal device 35 into its initial position, irrespective of the speed of operation.

As soon as the switch 36 is opened, coils 71 and 72 of the transformer switches 22 and 25 are deënergized, and said switches are permitted to open, whereby the phase converter 5 is disconnected from the transformer winding 4.

If voltage now returns to the source of energy and the line relay 11 is actuated to its raised position to disengage its switch members 63 and 64, it will be impossible to reconnect the phase converter 5 to the transformer winding 4 until the converter has again been brought up to full-speed value by means of the starting motor 9, inasmuch as the centrifugal device 35 will not again operate to close the switch 36 until full-speed conditions again obtain.

Attention is called to the fact that were it not for the electro-magnet 40 for actually effecting the disengagement of switch members 37 and 38 of switch 36 under prolonged conditions of no voltage, the converter 5 might be reconnected to the transformer winding 4 upon the restoration of voltage with the converter 5 running at a very low speed, which would subject the converter to damaging electrical and mechanical strains.

If centrifugal device 35 could be constructed to close the switch 36 at predetermined full-speed conditions and to open said switch at a predetermined slightly reduced speed, at which it would be safe to reconnect the phase converter to the source, the electro-magnet 40 would be unnecessary. However, in practice it is found that a centrifugal device of the type referred to, is not sensitive to slight variations in speed, and it would not, therefore, effect the disengagement of the switch 36 until a relatively low speed was attained, at which it would be unsafe to subject the phase converter 5 to the full voltage of the transformer winding 4.

If, under full operating conditions, the voltage fails for a period less than five seconds for which the dash-pot 65 is adjusted, the switch members 63 and 64 of the line relay 11 are not brought into engagement, and, hence, the switch 36 remains closed, and the phase converter 5 is not disconnected from the system. Obviously, when the voltage of the source returns, normal operation is resumed and the phase converter 5 is not subjected to excessive strains because of the fact that its speed of operation has been reduced but slightly.

The advantages and benefits of my invention may be attained by systems differing materially from that herein shown and described and I, therefore, desire that only such limitations shall be imposed as are indicated in the appended claims.

I claim as my invention:

1. The combination with a source of energy, a dynamo-electric machine, a main switch member for connecting said machine to said source, and a starting motor for bringing said machine up to speed, of means for closing said switch member to connect said machine to said source when full speed is attained, and electro-responsive means embodying a time-element device for effecting the opening of said switch member to disconnect said machine and for preventing reclosure of said switch member, under predetermined speed conditions.

2. The combination with a source of energy, a dynamo-electric machine, a main switch for connecting said machine to said source, and a starting motor for bringing said machine up to speed, of means for closing said switch to connect said machine to said source when full speed is attained, and means for effecting the opening of said switch to disconnect said machine if the source of energy fails for a predetermined length of time and for necessitating full-speed conditions before said switch can be reclosed to connect said machine to said source.

3. The combination with a source of energy, a dynamo-electric machine, a main switch for connecting said machine to said source, and a starting motor for bringing said machine up to speed, of means for closing said switch to connect said machine to said source when full speed is attained, and a time-element device responsive to a failure of said source of energy for causing said closing means to open said switch, irrespective of the speed of said machine, and for preventing reclosure of said switch, under predetermined speed conditions.

4. The combination with a source of energy, a dynamo-electric machine, a main switch for connecting said machine to said source, and a starting motor for bringing said machine up to speed, of a centrifugally operated switch for closing said switch when a predetermined speed is attained, an electro-magnet adapted to actuate said centrifugal switch and to cause the opening of said main switch, and a time element device dependent upon said source of energy for energizing said electro-magnet under predetermined conditions.

5. The combination with a source of energy, a dynamo-electric machine, a main switch for connecting said machine to said source, and a starting motor for bringing said machine up to speed, of a centrifugally operated switch for closing said main switch when a predetermined speed is attained, an electro-magnet adapted to actuate said centrifugal switch and to cause the opening of said main switch, a line relay adapted to normally interrupt the energizing circuit of said electro-magnet and to complete the energizing circuit thereof when the source of energy fails, and a time-element device associated with said line relay for delaying its action.

6. The combination with a source of energy, a dynamo-electric machine and a starting motor therefor, of automatic means for connecting said machine to said source, under predetermined speed conditions and thereupon disconnecting said starting motor, and other automatic means for disconnecting said machine from said source, under predetermined circuit conditions of said source and preventing the reconnection of said machine thereto until predetermined speed conditions obtain.

In testimony whereof, I have hereunto subscribed my name this 21st day of May, 1914.

ARTHUR J. HALL.

Witnesses:
H. T. Morris,
B. B. Hines.